United States Patent [19]

Hildebrandt et al.

[11]  4,197,870
[45]  Apr. 15, 1980

[54] APPARATUS FOR VENTILATING LIQUID CONTAINERS ON AIRCRAFT

[75] Inventors: Florian Hildebrandt, Gunding; Joachim Popp, Germering, both of Fed. Rep. of Germany

[73] Assignee: Motoren-und Turbinen-Union Munchen GmbH, Munich, Fed. Rep. of Germany

[21] Appl. No.: 945,892

[22] Filed: Sep. 26, 1978

[30] Foreign Application Priority Data

Sep. 30, 1977 [DE] Fed. Rep. of Germany ....... 2743994

[51] Int. Cl.$^2$ .............................................. F16K 17/36
[52] U.S. Cl. .......................................... 137/43; 137/45
[58] Field of Search ....................... 137/38, 39, 43, 45; 244/80, 135 R

[56] References Cited

U.S. PATENT DOCUMENTS

| 2,364,119 | 12/1944 | Anderson | 137/45 X |
| 2,684,254 | 7/1954 | Goss | 137/45 UX |
| 3,792,872 | 2/1974 | Jones | 137/45 X |
| 3,915,184 | 10/1975 | Galles | 137/45 X |

Primary Examiner—Robert G. Nilson
Attorney, Agent, or Firm—Haseltine, Lake & Waters

[57] ABSTRACT

An apparatus for ventilating a liquid tank in which ventilation pipes are arranged so that the orifice of at least one ventilation pipe is above the liquid level and the orifice of at least one ventilation pipe is below the liquid level. The remaining ends of the ventilation pipes connected to separate chambers which are sealed off from the tank interior. These chambers are associated with a rotary slide valve which can be controlled by the flight attitude. The control slots of this valve are staggered (offset) in such a way that with simultaneous free flow passage via at least one ventilation pipe located above the liquid level, flow passage via at least one ventilation pipe located below the liquid level is blocked.

8 Claims, 6 Drawing Figures

APPARATUS FOR VENTILATING LIQUID CONTAINERS ON AIRCRAFT

BACKGROUND OF THE INVENTION

The present invention relates to an apparatus for the ventilation of liquid tanks in aircraft during hazardous pressure rises where a pipe line ventilating the tank terminating above the tank is provided in all positions of the aircraft.

From German Laid-Open Document No. 2,347,635 there is known a ventilating apparatus on a gear box where a ventilation pipe projects on the side into the center of the tank so that the end of the ventilation pipe at any position of the gearbox is above the lubricant level forming in the tank.

Based on the lubricant quantity required for adequate lubrication, the known apparatus assumes a tank volume which must be many times the tank volume required by the lubricant.

In the known case there results a lubricant tank of relatively large dimensions and a relatively large weight.

In view of the payload space requirement and the weight, use of such apparatus in aircraft is not desirable.

Furthermore, liquid tanks during ventilation in aircraft are exposed to much more extreme operating conditions than is the case with other machines, such as drilling presses, etc.

These conditions include maintenance of the tank inside pressure in spite of relatively large acceleration forces acting on the liquid tank, as may arise with sudden and relatively fast descending or ascending flight or with relatively fast rotation of an aircraft about its roll axis, with simultaneous allowance for the mass inertia of the liquid in the tank.

It is an object of the present invention to eliminate the shortcomings in the present state of the art and to provide an apparatus which will ensure optimum ventilation of the liquid tank in all flight attitudes with relatively low tank volume.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved as follows:
(a) Inside the liquid tank, ventilation pipes are arranged so that the orifice of at least one ventilation pipe is above the liquid level, and the orifice of at least one other ventilation pipe is below the liquid level, with the remaining ends of the ventilation pipes connected to separate chambers which are sealed off from the tank interior.
(b) These chambers are associated with a rotary slide valve which can be controlled by the flight attitute by means of a weight. The control slots of this valve are offset in such a way that with simultaneous free flow passage via the minimum of one ventilation pipe located above the liquid level, flow passage via the minimum of one ventilation pipe located below the liquid level is blocked.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawings.

DESCRIPTION OF THE PREFERRED EMBODIMENTS

Figure 1:
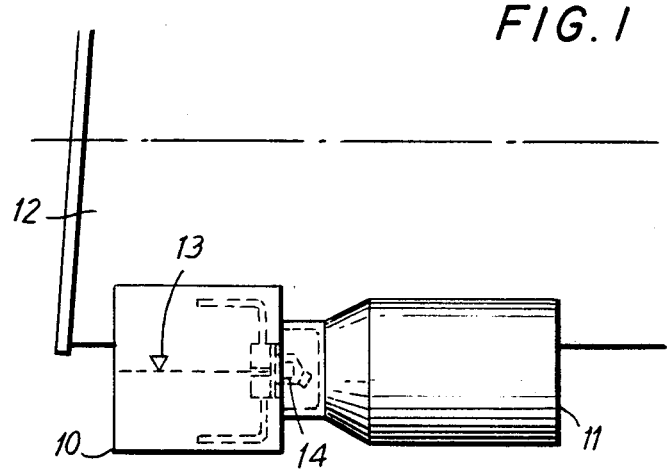
FIG. 1 shows a schematic side view of the apparatus and associated gearbox on the engine.

FIG. 1 explains the arrangement of the liquid tank 10, for example, an oil tank and an associated gearbox 11 on a turbine jet engine 12. The normal oil level is denoted by 13, and the rotary slide valve is denoted by 14.

Figure 2:
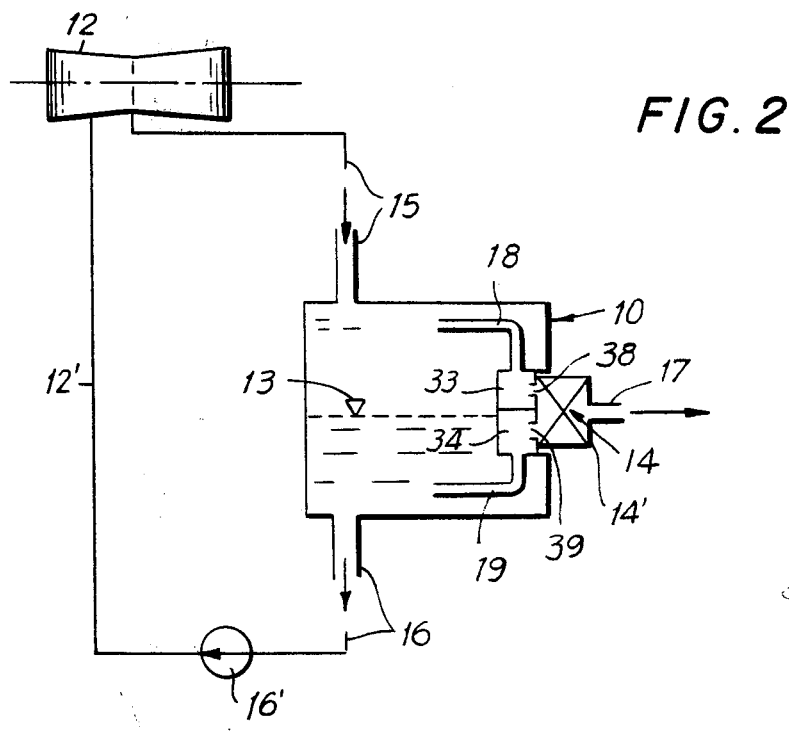
FIG. 2 shows a partial section of the apparatus in association with an oil cycle shown schematically adjacent to the engine.

FIG. 2 schematically shows the position of the liquid tank, half filled with oil, in the oil cycle. The oil return line 15 leads from the engine 12 directly to the liquid 10; from there the oil passes via a line 16 to a pump 16' which delivers it via a line 12' back to the engine.

A pressure rise in the tank with fluctuating oil level and/or flight attitudes other than the one shown, which is at standard conditions, is prevented by providing a ventilation line 17 on a housing 14' enclosing valve 14; in the present case this line leads to gearbox 11. Its pressure is held constant by other measures, for example, via a constant pressure valve. The continuing tank ventilation is provided by always having the discharge of the upper ventilation pipe 18 or of the lower ventilation pipe 19 above the oil level. Accordingly, in the rotary slide valve 14, associated cross sections must be opened or closed in a manner to be described later. The opening and closing of the cross sections must—like the oil level 13—be dependent on flight attitute which is accomplished by having a lever 26, loaded with a weight 27, drop a rotary slide 22 into the required position.

Figure 3:
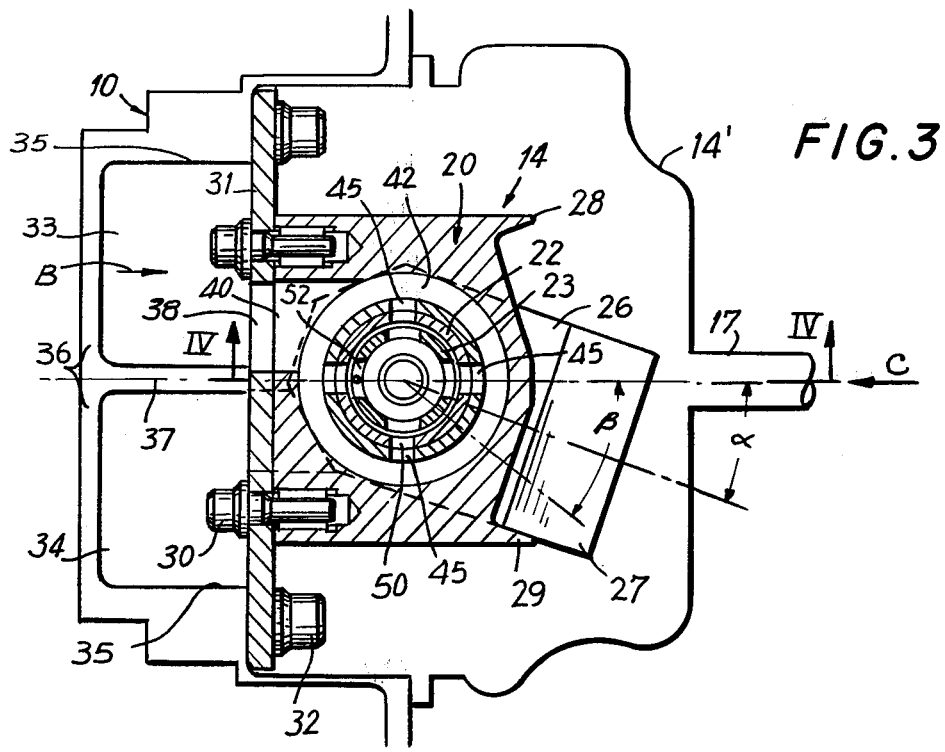
FIG. 3 shows a cross section of the rotary slide valve which is part of the apparatus, including associated fasteners on the liquid tank.
Figure 4:
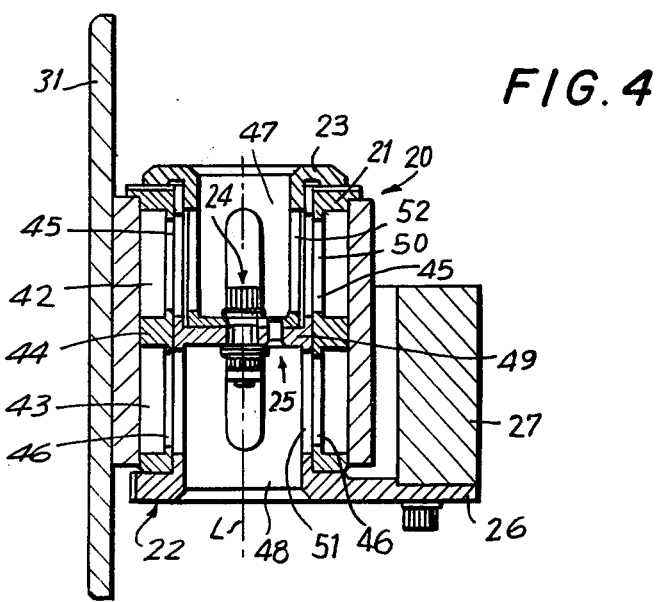
FIG. 4 shows a section taken along line IV—IV of FIG. 3.

FIGS. 3 and 4 show the components of the rotary slide valve 22. An insert 21 is soldered into a housing 20. In the housing 21, the rotary slide 22 is rotatably mounted, including an associated sleevelike insert 23, both being connected by a thread connection 24 and secured against misalignment by the pin 25. The rotary slide 22 has on lever 26 the weight 27 whose travel in the peripheral direction, in relation to the center of the rotary slide, is restricted by the stops 28, 29 on the housing. The housing 20 is fastened by bolts 30 to a base plate 31 which is fastened to the liquid tank 10 via bolts 32. However, a casting combining housing 20 and base plate 31 is also feasible.

Inside the liquid tank 10 are two chambers 33, 34 (FIGS. 2 and 3) with chamber 33 connected to the upper ventilation pipe 18 and chamber 34 connected to the lower ventilation pipe 19. Both chambers 33, 34 are separated from the liquid tank 10 by walls 35 and 36 and from each other by the web 37 (FIG. 3).

Figure 5:
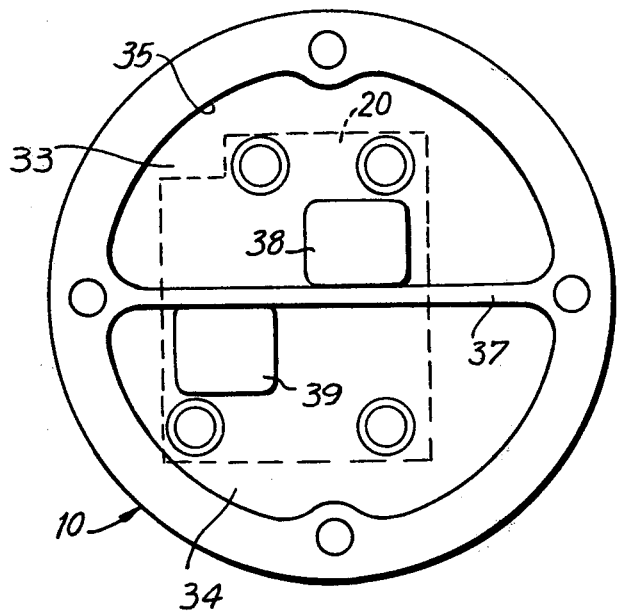
FIG. 5 shows a view of the rotary slide valve in the direction B of FIG. 3.

The base plate 31 has two openings 38, 39 (FIG. 5) with the opening 38 belonging to chamber 33 and opening 39 belonging to chamber 34. The housing 20 has similar openings 40, 41 (FIG. 3) which are connected to two separate annular channels 42, 43 of insert 21 (FIGS. 3 and 4). These channels are coaxial with the longitudinal axis of rotary slide 22 and are separated by a web 44. FIGS. 3 to 5 show that openings 38, 40 on the one hand, and 39, 41 on the other hand, are arranged so that they are not only separated from each other by a web 37, but are also offset sideways so that 38/40 are connected to annular channel 42 and 39/41 to annular channel 43. In this case the insert 21 has four slots 45, 46 with slots 45 associated with annular channel 42 and slots 46 associated with annular channel 43. Because of pressure balance between the insert 21 and the rotary slide 22/23, two slots facing each other must be provided for each annular channel 42, 43.

The four slots 45 and 46, respectively, of insert 21 are spaced apart equally in the peripheral direction and parallel to the lengthwise axis L of the rotary slide 22 above one another.

The rotary slide 22 also has four control slots 50, 51 located at the level of either annular channel 42, 43, that is, at the level of slots 45, 46 of insert 21; however, control slots 51 are offset relative to control slots 50.

The rotary slide 22 furthermore has two cylinder chambers 47, 48, with cylinder chamber 47 being formed by the sleevelike insert 23 which is provided with flow slots 42 which always coincide with slots 50 of the rotary slide 22. The sleevelike insert is to provide axial fixing of all rotary parts. Also, cylinder chambers 47, 48 are separated by a wall 49 (FIG. 4).

According to FIG. 3, the control slots 51 are offset from control slots 50 in the axial direction by an angle $\beta = 2\alpha$. The control slots 50 in the drawing coincide with slots 45 of insert 21. If the slide is turned by $2\alpha = \beta$, control slots 51 of rotary slide 22 coincide with slots 46 of insert 21. The angle $\beta$ is selected so that either a flow pipe 18/chamber 33/openings 38 and 40/annular channel 42/slots 45, 50, 52/cylinder chamber 47 is possible, with a flow pipe 19/chamber 34/openings 39 and 41/annular channel 43/slots 46 and 51/cylinder chamber 48 being interrupted by the offset slots 46 and 51, or vice versa.

The air flow leaving either cylinder chamber 47 or 48 reaches the ventilation line 17, which is connected to the gear box 11, via the rotary slide valve 14 space enclosed by housing 14' (FIG. 2).

The liquid tank 10 is fully ventilated when the position of the oil level in the tank frees one of the two ventilation pipes 18 or 19 and simultaneously the weight 27, owing to the resultant of all accelerations acting thereon, contacts either stops 28 or 29 so that there is ventilation pipe 18 to chamber 47 and a blockage of slot 46 against 51 (stop at 29), or a ventilation pipe 19 to chamber 48 and a blockage slot 45 against slot 50 (stop at 28).

The rotary slide valve is to be used effectively even when the weight 27 leaves its end position and partially closes the ventilating slots and partially opens the closing slots (for example, at 90° ascending flight).

Figure 6:
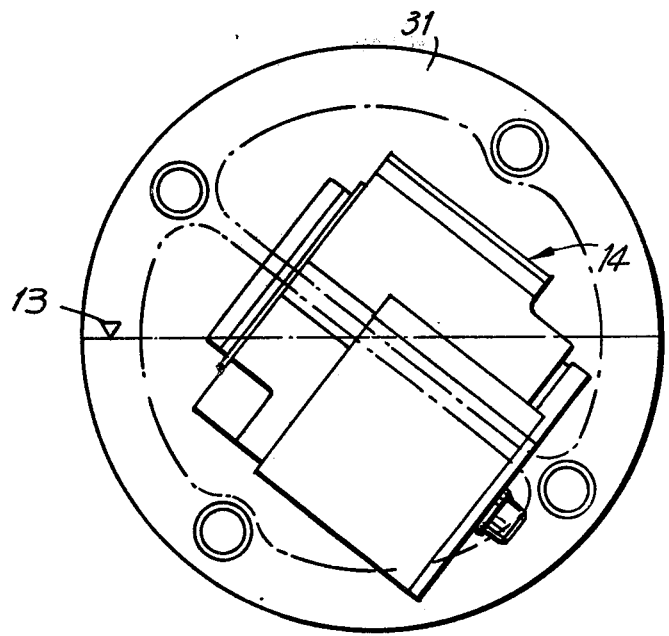
FIG. 6 shows a view of the rotary slide valve in the direction C of FIG. 3, with the rotary slide valve rotated in relation to FIG. 3.

Optimization of the functioning ability can be obtained by a suitable choice of the position of the connections of the two ventilation pipes 18, 19 in the liquid tank, and by turning the entire valve in relation to the liquid tank (FIG. 6); in this turned position it can be fastened again to the liquid tank 10 by means of blots 32.

There is the possibility of diverse variations regarding the construction of the apparatus depending on operational needs (not shown in the drawings).

For example, it is possible to provide several separate chambers within the liquid tank, where these chambers are associated with several separate annular channels of the rotary slide which may be connected via flow slots with associated separate chambers of the rotary slide where, for example, with three separate chambers arranged inside the liquid tank, besides the two end positions of the rotary slide restricted by the housing stops, a middle (central) end position can be selected for tank ventilation.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Apparatus for ventilating a liquid tank in aircraft during hazardous pressure rises for all aircraft attitudes, comprising: a plurality of ventilation pipes, at least one of said ventilation pipes having an orifice above the liquid level of said tank and at least one of said ventilation pipes having an orifice below said liquid level; two separate chambers sealed off from the interior of said tank and connected to said ventilation pipes; a rotary slide valve associated with said chambers and having a weight for controlling said rotary slide valve according to flight attitude; said rotary slide valve having control slots offset so that flow via said ventilation pipe below said liquid level is blocked during free flow via said ventilation pipe above said liquid level.

2. Apparatus as defined in claim 1 including rotary slide means; a housing connected to said tank and pivotally mounting said rotary slide means; said housing having two stops for maximum displacement of said weight connected to said rotary slide means.

3. Apparatus as defined in claim 2 including insert means connected to said housing for forming two adjacent separate annular channels between said housing and said rotary slide means, said annular channels corresponding to two separate housing openings; a base plate with further openings connected to said housing openings, said housing openings being connected to two said chambers through said further openings of said base plate, said rotary slide means having two cylindrical chambers separated by a wall, said cylindrical chambers being opened on the outer ends facing away from said wall and opening into a space enclosing said valve and being connected to a ventilation line, said insert means having slots at levels of both said annular channels, said channels being located in common lengthwise planes and being uniformly spaced in a peripheral direction, said rotary slide means having also control slots located at the level of either annular channel and being offset from their respective annular channels and chamber in a peripheral direction, so that depending on an end position of said rotary slide means either one annular channel is connected via slots of said insert means and said rotary slide means to one of said cylindrical chambers or the other annular channel is connected via other slots of said insert means and said slide means to the other cylindrical chamber.

4. Apparatus as defined in claim 3 wherein one of said cylindrical chambers is formed by a sleeve-shaped insert connected rigidly to said rotary slide means, said sleeve-shaped insert having flow slots aligned coincidentally with said control slots of said rotary slide means.

5. Apparatus as defined in claim 2 wherein said liquid tank has a plurality of separate chambers associated with a plurality of separate annular channels connectable through flow slots with respective separate chambers of said rotary slide means, a centered end position being selectable for said rotary slide means for tank ventilation in addition to two end positions of said rotary slide means restricted by said stops when three separate chambers are arranged within said tank.

6. Apparatus as defined in claim 2 wherein said rotary slide means has a longitudinal axis lying in a plane defined by the roll axis and pitch axis of the aircraft.

7. Apparatus as defined in claim 2 wherein said rotary slide means has a longitudinal axis inclined towards the plane defined by the roll axis and pitch axis of the aircraft.

8. Apparatus as defined in claim 2 wherein said rotary slide valve is arranged on said tank and has a variable position.

* * * * *